United States Patent
Schneider et al.

(10) Patent No.: US 11,243,517 B2
(45) Date of Patent: *Feb. 8, 2022

(54) COMMUNICATION UNIT, CONTROL APPARATUS, COMMUNICATION SYSTEM AND METHOD

(71) Applicant: Festo SE & Co. KG, Esslingen (DE)

(72) Inventors: Danny Schneider, Lichtenwald (DE); Christian Waldeck, Esslingen (DE); Eduard Faber, Stuttgart (DE); Thomas Lederer, Kernen (DE)

(73) Assignee: FESTO SE & CO. KG, Esslingen (DE)

( * ) Notice: Subject to any disclaimer, the term of this patent is extended or adjusted under 35 U.S.C. 154(b) by 181 days.

This patent is subject to a terminal disclaimer.

(21) Appl. No.: 16/682,629

(22) Filed: Nov. 13, 2019

(65) Prior Publication Data

US 2020/0166912 A1   May 28, 2020

(30) Foreign Application Priority Data

Nov. 26, 2018  (DE) .......................... 102018220301.6

(51) Int. Cl.
| | |
|---|---|
| *G05B 19/418* | (2006.01) |
| *G06F 1/12* | (2006.01) |
| *H04J 3/06* | (2006.01) |
| *G06F 1/08* | (2006.01) |

(52) U.S. Cl.
CPC .......... *G05B 19/4185* (2013.01); *G06F 1/08* (2013.01); *G06F 1/12* (2013.01); *H04J 3/0658* (2013.01); *G05B 2219/25041* (2013.01)

(58) Field of Classification Search
CPC ......... G05B 19/4185; G06F 1/08; G06F 1/12; H04J 3/0658
USPC .......................................................... 713/500
See application file for complete search history.

(56) References Cited

U.S. PATENT DOCUMENTS

| | | | | |
|---|---|---|---|---|
| 5,574,726 | A | * 11/1996 | Chan | ...................... H04L 12/413 370/402 |
| 2011/0211582 | A1 | 9/2011 | Zhou et al. | |
| 2012/0096509 | A1* | 4/2012 | Zeng | ...................... H04L 25/247 725/127 |
| 2012/0257699 | A1* | 10/2012 | Choi | ...................... H04L 7/0008 375/359 |

(Continued)

FOREIGN PATENT DOCUMENTS

| | | |
|---|---|---|
| DE | 19917354 A1 | 10/2000 |
| DE | 102014105211 A1 | 10/2015 |
| WO | 2013/144001 A1 | 10/2013 |

*Primary Examiner* — Paul R. Myers
(74) *Attorney, Agent, or Firm* — Hoffmann & Baron, LLP

(57) ABSTRACT

A communication unit (S1, S2) for industrial automation for use in a communication system (10) of series-connected communication units (M, S1, S2). The communication unit includes a first input (E1), a first output (A1), and an internal clock generator (TG) which is adapted to provide an internal clock signal as system clock for clocking the communication unit (S1, S2), and wherein the communication unit (S1, S2) is configured to receive, via the input (E1), a serial input data stream with payload data. The communication unit (S1, S2) has a timer (ZG) for providing a time value, the timer (ZG) being adapted to provide the time value based on an input symbol clock included in the input data stream.

15 Claims, 2 Drawing Sheets

(56) References Cited

U.S. PATENT DOCUMENTS

| | | | | |
|---|---|---|---|---|
| 2014/0233668 A1* | 8/2014 | Pham | ................... | H04L 7/0016 |
| | | | | 375/278 |
| 2017/0286359 A1* | 10/2017 | McGowan | .......... | G06F 13/4291 |
| 2018/0300282 A1* | 10/2018 | Vertenten | ................ | G06F 5/065 |
| 2020/0166911 A1* | 5/2020 | Schneider | ............. | H04J 3/0658 |

* cited by examiner

COMMUNICATION UNIT, CONTROL APPARATUS, COMMUNICATION SYSTEM AND METHOD

BACKGROUND OF THE INVENTION

The invention relates to an communication unit for industrial automation. The communication unit is to be used in a communication system of series-connected communication units. The communication unit comprises a first input and a first output. The communication unit further comprises an internal clock generator. The internal clock generator is adapted to provide an internal clock signal as a system clock for clocking the communication unit. The communication unit is configured to receive, via the input, a serial input data stream with payload data.

In this context, the term "system clock" is intended in particular to refer to the clock signal with which the electronics, in particular the digital circuits, of the communication unit are clocked. The internal clock generator, which provides the system clock, can also be referred to as local clock generator or as local clock.

WO 2013/144001 A1 describes a communication system with at least two serially connected communication modules, namely a master module and a slave module. The master module sends an "interframe symbol", which the slave module uses to synchronize its local clock generator.

SUMMARY OF THE INVENTION

An object of the invention is to provide a communication unit that can be more easily and/or more accurately synchronized to a global clock.

The object is solved by a communication unit for industrial automation for use in a communication system of series-connected communication units, said communication unit comprising a first input and a first output as well as an internal clock generator adapted to provide an internal clock signal as a system clock for clocking said communication unit, and the communication unit being configured to receive via the input an input serial data stream having payload data. The communication unit has a timer for providing a time value, the timer being adapted to provide the time value based on an input symbol clock included in the input data stream.

Consequently, in addition to the internal clock generator—i.e. in addition to the local clock—a timer is provided and this timer is then synchronised. The internal clock generator is not necessarily synchronized but can remain unsynchronized. The communication unit can therefore continue to work with its own expediently non-synchronized internal clock signal—i.e. its own system clock—but, due to the time value provided by the timer, is nonetheless able to perform events and/or actions synchronously with a global clock by performing these events and/or actions according to the provided time value.

The global clock is contained as input symbol clock in the input data stream. Since the global clock is contained in the data stream as a symbol clock—and is therefore constantly present (if the data stream is present)—the timer is constantly synchronous with the global clock.

The terms "input symbol clock" and "input data stream" are used to indicate the symbol clock or data stream received by the communication unit. The term "symbol clock" refers in particular to a transmit clock (or a transmit clock cycle).

The invention further pertains to a control apparatus comprising a communication unit in accordance with the invention. The control apparatus is adapted to use the time value as a time stamp and/or to perform a time-based control of a functional unit, in particular an actuator, sensor and/or a signal unit, according to the time value. The functional unit is in particular a valve device.

Expediently, the invention pertains to a field device, in particular a valve device, which comprises a communication unit in accordance with the invention.

Preferably, the invention pertains to one of the following apparatuses, wherein the apparatus comprises one or more communication units in accordance with the invention: Remote I/O system, motor controller, path/robotics control, pneumatic valve, media valve, valve terminal, valve island, industrial sensor, camera system, decentralized programmable logic controller, safety control, especially for functional safety, protocol converter, operating panel.

The invention further pertains to a method for determining a time value for a communication unit, comprising the steps: providing, by means of an internal clock generator of the communication unit, an internal clock signal as a system clock of the communication unit, receiving, by means of a first input of the communication unit, a serial input data stream with payload data, providing, by means of a timer of the communication unit, the time value on the basis of an input symbol clock contained in the input data stream.

The method is preferably carried out using the communication unit described. Expediently, the method is adapted in correspondence to a described embodiment of the communication unit.

BRIEF DESCRIPTION OF THE DRAWINGS

An exemplary embodiment as well as further exemplary details are explained below with reference to the figures.

DETAILED DESCRIPTION

Figure 1:
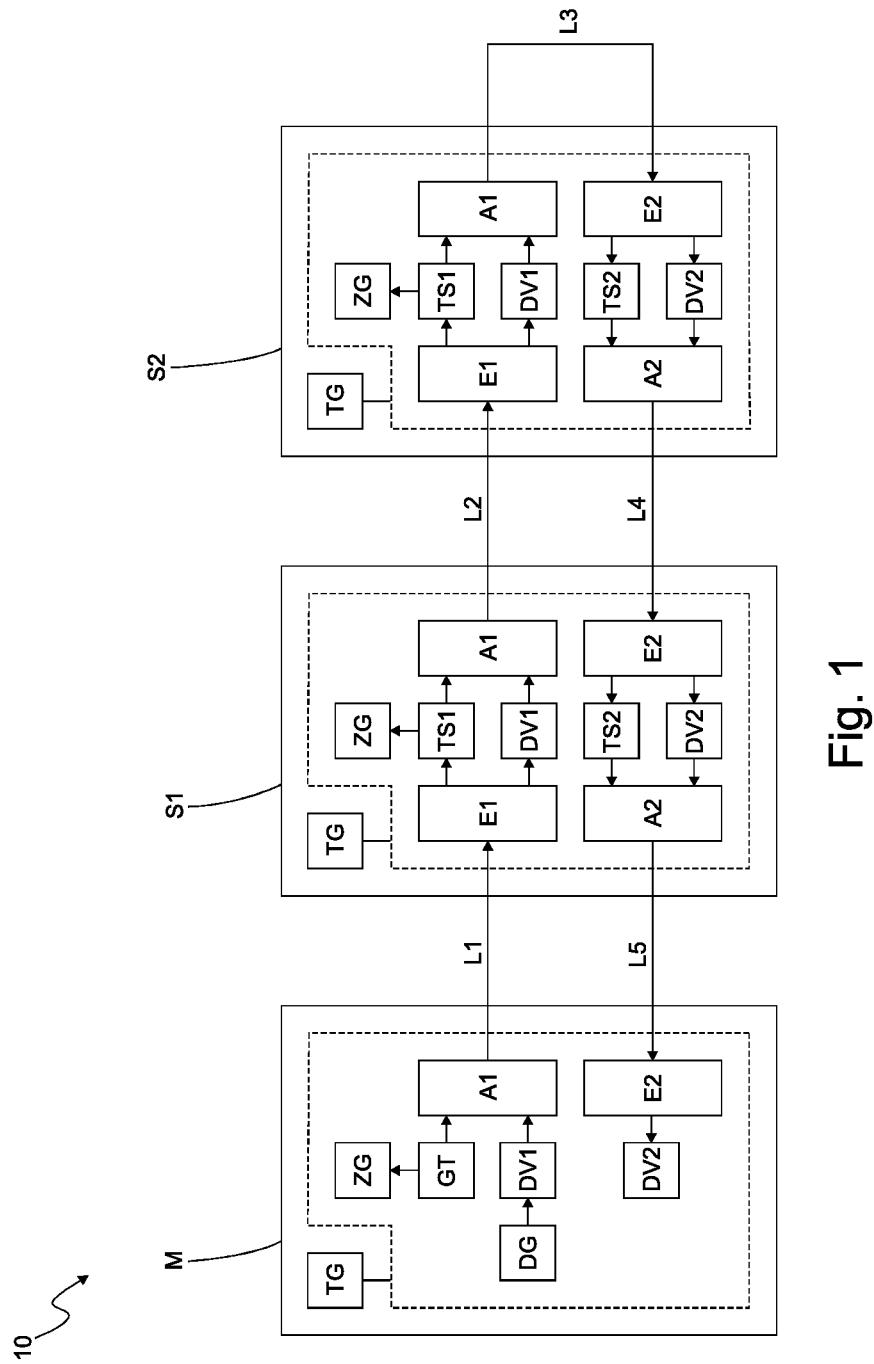
FIG. 1 shows a schematic representation of a communication system with several communication units.

FIG. 1 shows a communication system 10 comprising plural communication units M, S1, S2 connected in series. Exemplarily, two communication units S1, S2 acting as slaves and one communication unit M acting as master are present. The communication units S1, S2 can also be referred to as slave units and the communication unit M can be referred to as master unit. More or fewer communication units S1, S2 acting as slaves may be present, as an alternative to the shown amount. Expediently, each communication unit S1, S2, by itself, represents an embodiment of the invention. The following explanations primarily refer to the communication unit S1. The communication unit S2 is expediently adapted in correspondence thereto.

The communication unit S1, in particular the entire communication system 10, serves for use in industrial automation, in particular process automation and/or factory automation.

The communication unit S1 comprises a first input E1 and a first output A1. The communication unit S1 further includes an internal clock generator TG. The internal clock generator TG is adapted to provide an internal clock signal as a system clock for clocking the communication unit S1.

The communication unit S1 is configured to receive a serial input data stream with payload data via the input E1. The communication unit S1 has a timer ZG for providing a time value. The timer ZG is adapted to provide the time value based on an input symbol clock included in the input data stream.

Further exemplary details will be explained below.

First, the basic structure of the communication system 10 shown in FIG. 1 will be discussed.

The communication system 10 comprises the communication units M, S1, S2, which are exemplarily connected in series. Each communication unit M, S1, S2 represents a series member with a series position within the series. As an example, the communication unit M is the first series member, the communication unit S1 is the second series member and the communication unit S2 is the third series member. Expediently, the series may have one or more further communication units acting as slaves, which are then in particular adapted in correspondence to the communication units S1, S2.

Two communication units adjacent in the series are respectively connected to each other by a communication link. Exemplarily, each communication link comprises two lines. The communication unit M is connected to the communication unit S1 via the lines L1, L5 and the communication unit S1 is connected to the communication unit S2 via the lines L2, L4. The communication links between two adjacent communication units in the series are each bidirectional, one of the two lines serving exclusively for communication in a first direction and the other line serving exclusively for communication in the opposite second direction.

The communication system 10 provides a communication path that, starting from communication unit M, passes through all subsequent communication units S1, S2 twice and then returns to communication unit M. The first run (also referred to as the "outward path") takes place in the sequence specified by the series—i.e. exemplarily in the sequence M, S1, S2. The second run (also called "return path") takes place in reverse order—i.e. exemplarily in the order S2, S1, M. Altogether a ring topology results. During operation, the serial data stream follows this communication path—i.e. the serial data stream passes through all communication units M, S1, S2 twice—once on the outward path and once on the return path.

In the last series element—here the communication unit S2—an output A1 is directly connected to an input E2 via a line L3 in order to close the communication path.

The communication path thus comprises a plurality of path sections, the path sections being provided along the communication path alternately by a communication unit and a line, exemplarily in the following order: M, L1, S1, L2, S2, L3, S2, L4, S1, L5, M. Accordingly, the serial data stream alternately passes through a communication unit and a line respectively on its way along the communication path.

According to a possible embodiment, the communication unit M can also be arranged between the communication units S1 and S2 or at the very end of the series. The communication unit M can have an additional input and an additional output (compared to the configuration shown in FIG. 1). As an example, the communication unit M can, like the communication units S1, S2, have an (additional) input E1 and an (additional) output A2. With the additional input and output, the communication unit M can communicate with the communication unit upstream in the series (if such an upstream communication unit exists).

In the following, the individual communication units M, S1, S2 are described in more detail.

The two communication units S1, S2 acting as slaves and the communication unit M acting as master can basically each have the same or alike hardware, i.e. in particular the same or alike electronics. Expediently, a communication unit can, by setting a corresponding mode, be selectively operated as a master or as a slave.

First, the communication units S1, S2 acting as slaves shall be described. The following explanation refers primarily to the communication unit S1. Expediently, the communication unit S2 as well as further optional communication units acting as slaves are designed identically.

As mentioned above, the communication unit S1 comprises a first input E1, a first output A1, an internal clock generator TG and a timer ZG. As an example, the communication unit S1 also has a second input E2 and a second output A2.

The first input E1 and the second output A2 shall together be referred to as the first communication interface. The first communication interface is used for bidirectional connection with the communication unit respectively connected upstream in the series. The second input E2 and the first output A1 shall together be referred to as the second communication interface. The second communication interface is used for bidirectional connection with the communication unit respectively connected downstream in the series. In the communication unit with the last series position, the second communication interface is used to close the communication path.

The first input E1 is communicatively coupled with the first output A1. A first clock synthesis unit TS1 and a first data processing unit DV1 are exemplarily present between the first input E1 and the first output A1. The second input E2 is communicatively coupled with the second output A2. Exemplarily, a second clock synthesis unit TS2 and a second data processing unit DV2 are present between the second input E2 and the second output A2.

The communication unit S1 comprises an electronic circuit, for example a microprocessor, ASIC and/or FPGA. The units E1, TS1, DV1, A1, E2, TS2, DV2, A2 explained below are expediently part of the electronic circuit. The electronic circuit is clocked by the internal clock generator TG, i.e. the internal clock generator TG provides the internal clock signal as system clock for the electronic circuit. The electronic circuit clocked by the internal clock signal and/or a clock signal derived therefrom is indicated in FIG. 1 by a dashed frame.

The internal clock generator TG can also be called a local clock generator or a local clock. Exemplarily, the internal clock generator TG comprises a quartz via which the internal clock signal is provided.

The internal clock generator TG is expediently adapted to provide the internal clock signal independently of the input symbol clock. In particular, there is no synchronization and/or adaptation of the internal clock signal based on the input symbol clock.

Expediently, each communication unit M, S1, S2 has its own internal clock generator TG, which respectively provides an distinct internal clock signal as distinct system clock for the respective electronic circuit. This means in particular that the internal clock signals—i.e. the system clocks—of the communication units M, S1, S2 can differ from each other. Expediently, there is no synchronization of the internal clock signals, so that the internal clock signals of different communication units M, S1, S2 are not synchronous to each other.

The communication unit S1 comprises the first input E1. To the first input E1, the line L1, in particular a cable or two wires, is connected, via which the data stream is transmitted to the communication unit S1. The communication unit S1 is adapted to receive, via the input E1, the data stream as input data stream. The input E1 can also be referred to as a receiving unit or as "RX".

The communication unit S1 is expediently configured to extract the input symbol clock from the received input data stream, in particular by oversampling and/or on the basis of phase information. Expediently, the input symbol clock is extracted with a higher temporal resolution than the width of a symbol.

The input symbol clock is expediently the clock (or clock cycle or interval) with which the individual symbols contained in the input data stream are one after another received at the communication unit S1, in particular the first input E1. Exemplarily, the symbols are individual bits, in particular line bits (e.g. the bits transmitted on the wire). A symbol is expediently represented by existence or non-existence of an impulse. An impulse may also be referred to as a "pulse". Exemplarily the input data stream is encoded with an 8b10b code. Expediently, the input data stream is a baseband transmission.

As mentioned above, the timer ZG is adapted to provide the time value based on the input symbol clock. Exemplarily, the timer ZG is an counter. The timer ZG is adapted to increment or decrement the time value for an incoming symbol, for example a bit, in particular a line bit. Expediently, the time value is incremented or decremented for each incoming symbol. The timer ZG is adapted to continuously progress (or lead or carry) the time value according to the incoming input symbol clock.

Exemplarily, the timer ZG receives the symbol clock from the clock synthesis unit TS1 explained below. Alternatively or additionally, the timer ZG can receive the symbol clock from the first input E1, the first output A1, the second input E2, the second output A2 and/or the clock synthesis unit TS2.

The communication unit S1 further includes the output A1. The output A1 is connected to the line L2, in particular a cable or two wires, via which the data stream is transmitted as an output data stream to the downstream communication unit S2. The output A1 can also be referred to as a transmitting unit or as "TX".

Exemplarily, there are two paths between the first input E1 and the first output A1. First, a data path for processing the payload data contained in the data stream and, second, a clock path for processing the symbol clock contained in the data stream. The data path and the clock path run exemplarily parallel to each other.

The data path contains the data processing unit DV1, which can also be referred to as Data Processing Unit, DPU. In the data processing unit DV1, the data contained in the data stream can be changed expediently.

The clock path exemplarily includes a clock synthesis unit TS1. The clock synthesis unit TS1 is used in particular to synthesize an output symbol clock based on the input symbol clock. Alternatively or additionally, the clock synthesis unit serves to provide the output A1 with the required information, in particular phase and/or frequency information, so that the output A1 can provide the output data stream with an output symbol clock having the same clock rate as the input symbol clock.

Expediently, the communication unit S1 is adapted to provide at its first output A1 an output data stream having an output symbol clock whose clock rate is identical to the clock rate of the input symbol clock of the input data stream. Due to the clock rate of the output symbol clock being identical to the clock rate of the input symbol clock, it is ensured that each subsequent communication unit in the series receives an input symbol clock with the same clock rate. Consequently, in each communication unit the respective time value is incremented or decremented according to the same clock rate, i.e. equally fast. In this way a complete synchronization of the time values is possible, especially if the constant time offsets—hereinafter also referred to as latencies—between the timers of different communication units are determined and compensated. The compensation of latencies is explained in detail below.

The communication unit S1 is preferably configured to provide the output data stream with an output symbol clock having a permanently fixed phase relationship to the input symbol clock. In particular, the communication unit S1 is configured to continuously adapt the signal shape of the output data stream in order to achieve the permanently fixed phase relationship. The signal shape may also be referred to as "waveform".

Expediently, the communication unit S1 is configured to detect a phase relationship and/or a clock rate relationship between the input symbol clock and the internal clock signal (and/or a clock signal derived from the internal clock signal). Furthermore, the communication unit S1 is adapted to provide, by means of the clock synthesis unit S1, the output symbol clock based on the detected phase relationship and/or clock rate relationship.

The clock rate of the internal clock signal is different from the clock rate of the input symbol clock, in particular the clock rate of the internal clock signal is lower than the clock rate of the input symbol clock. Expediently, a sampling clock signal is derived from the internal clock signal, which sampling clock signal is used to sample the input data stream at the first input E1. Expediently, the sampling clock signal has a higher clock rate than the input symbol clock. The sampling clock signal is generated by a phase-locked loop, PLL, for example. The phase relationship and/or clock rate relationship indicates in particular how the internal clock signal (and/or a derived clock signal, for example the sampling clock signal) relates to the input symbol clock.

Due to tolerances, the clock rates of the internal clock signals of different communication units S1, S2 may differ from each other. As an example, the clock rate of the internal clock signal of the communication unit S1 is higher than the clock rate of the internal clock signal of the communication unit S2. In this case, the communication unit S1 will experience its input symbol clock slower than the communication unit S2 experiences the identical input symbol clock.

The different clock rates of the internal clock signals result in different phase relationships and/or clock rate relationships for the different communication units S1, S2. Expediently, the communication units S1, S2 are configured to use the respective phase relationship and/or clock rate relationship for synthesizing the output symbol clock, in order to compensate for the different clock rates between the respective internal clock signals.

In an exemplary case, the clock rate of the internal clock generator of a communication unit S1 is increased. The communication unit S1 recognizes this by means of the phase relationship and/or clock rate relationship—i.e. how its internal clock signal and/or a clock signal derived from it behaves relative to the input symbol clock. The communication unit S1 detects that the clock rate of its internal clock generator is increased. The communication unit S1 takes its increased clock rate into account accordingly for synthesizing the output symbol clock, in particular by adapting the signal shape of the output data stream accordingly. For example, the communication unit S1 adapts the signal shape of the individual symbols, in particular the line bits. Expediently, the communication unit adjusts the width of the symbols in relation to the clock rate of its internal clock signal. For a increased clock rate of the internal clock signal, the width of the symbols with respect to the internal clock signal is expediently increased; i.e. the communication unit uses an increased number of clock cycles of the internal clock signal and/or a clock signal derived therefrom to synthesize a symbol of the output data stream. In particular, the number of clock cycles referred to may be a fraction.

If the clock rate of the internal clock signal of the communication unit S1 is reduced, the communication unit S1 recognizes this by a corresponding phase relationship and/or clock rate relationship and also takes this into account for synthesizing the output symbol clock, in particular by correspondingly adapting the signal shape of the output data stream. For a reduced clock rate of the internal clock signal, the width of the symbols with respect to the internal clock signal is expediently reduced; i.e. the communication unit uses a reduced number of clock cycles of the internal clock signal and/or a clock signal derived therefrom to synthesize a symbol of the output data stream. In particular, the number of clock cycles referred to may be a fraction.

In particular, by the measures described above, the first input E1 and the first output A1 are expediently coupled together such that (independent of the clock rate of the internal clock generator) the clock rate of the output symbol clock provided at the first output A1 is identical to the clock rate of the input symbol clock received at the first input E1.

Expediently, the foregoing applies correspondingly to the second input E2 and the second output A2, which are preferably coupled together in an corresponding manner so that the clock rate of the output symbol clock provided at the second output A2 is exactly identical to the clock rate of the input symbol clock received at the second input E2.

This is expediently the case for all communication units S1, S2 of the communication system 10 acting as slaves, so that therefore at each input and output through which the communication path or the serial data stream passes exactly the same symbol clock is given.

Expediently the communication unit S1 is adapted to provide the output data stream output at the first output A1 with the same number of symbols as the input data stream received at the first input E1 contains. Further, the communication unit S1 is expediently adapted to provide the output data stream output at the second output A2 with the same number of symbols as the input data stream received at the second input E2 contains. This applies expediently to all communication units S1, S2 acting as slaves.

Consequently, the communication units S1, S2 acting as slaves do not insert any additional symbols into the serial data stream and/or do not remove any symbols contained in the serial data stream. Expediently, by means of the data processing units DV1, DV2, data contained in the data stream, preferably payload data, can be modified in the communication units S1, S2, but preferably only in such a way that the number of symbols remains constant.

In this way it can be ensured that the timers ZG of the various communication units S1, S2 always receive the same number of symbols and thus (with compensation of the latencies between the communication units S1, S2) always remain synchronous, i.e. always indicate the same time value.

In the following, the communication unit M, which functions as the master, will be described in more detail:

The communication unit M has a clock generator GT for generating a global clock. Exemplarily, the clock generator GT generates the global clock based on the internal clock signal of the internal clock generator TG of the communication unit M.

The communication unit M further has a timer ZG, which is adapted to provide a time value based on the global clock. The timer ZG is a counter that is incremented or decremented according to the global clock. In particular, the timer ZG runs synchronously with timers ZG of communication units S1, S2 acting as slaves and preferably always provides the same time value as the other timers ZG.

The communication unit M comprises an electronic circuit, for example a microprocessor, ASIC and/or FPGA. The units A1, E2, DG, GT, ZG are expediently part of the electronic circuit. The electronic circuit is clocked by the internal clock generator TG, i.e. the internal clock generator TG provides the internal clock signal as system clock for the electronic circuit. The electronic circuit is indicated in FIG. 1 by a dashed frame.

The communication unit M has an output A1 and an input E2. Furthermore, the communication unit M has a data stream generator DG for generating a data stream. The communication unit M is configured to provide the data stream as an output data stream at its output A1. The communication unit M uses the global clock as the output symbol clock of the output data stream. The output symbol clock can also be referred to as transmit clock of the output data stream. Optionally, the communication unit M further has data processing units DV1, DV2.

The communication unit M sets, by means of the global clock, the output symbol clocks of all communication units S1, S2 acting as slaves. Furthermore, the communication unit M sets, by means of the global clock, the bit rate of the serial data stream.

The communication unit M is preferably configured to provide the serial data stream as a sequence of telegrams. Expediently, the telegrams in the serial data stream are stringed together directly, i.e. without gaps. Expediently, the telegrams contain payload data and/or data fields for each communication unit S1, S2 following in the series.

The communication unit M is configured to provide the serial data stream as a gapless data stream—i.e. in particular uninterrupted. If the communication unit M has no data available for transmission, in particular no payload data, the communication unit M fills the serial data stream with idle symbols. The output symbol clock is expediently provided by all symbols contained in the serial data stream, i.e. in particular by symbols representing payload data, idle data and/or protocol data.

In total, for the communication system 10 a serial data stream results, which, starting from the communication unit M, runs through the following communication units S1, S2 on the aforementioned communication path and always has exactly the same symbol clock rate at every point of the communication path. Furthermore, as mentioned above, the number of symbols is not changed by the communication units S1, S2 acting as slaves, so that the same number of symbols or clock cycles arrive at each timer.

Each communication unit S1, S2 acting as slave receives the data stream as input data stream and outputs the data stream as output data stream. The data, in particular the payload data, of the output data stream may be different from the input data stream; the number of symbols or clock cycles, however, should always remain constant.

In particular, the data stream is coded with a DC voltage-free code. Preferably the data stream is coded with an 8b10b code. Expediently, the data stream is transmitted in the baseband. The data stream is in particular a sequence of binary symbols, in particular impulses.

In the communication system 10, the respective internal clock generators TG of the communication units M, S1, S2 are expediently not synchronous with each other and, in particular, have different clock rates.

The timers ZG run, via the coupling to the input symbol clock, synchronously to the global clock and provide the same time value.

In the following, it will be discussed in more detail how the latencies between the timers ZG can be compensated.

Since, as explained above, the timers ZG are all synchronized to the same global clock via the input symbol clocks, and furthermore, expediently no symbols or clock cycles are removed or added on the communication path, the latencies between the timers ZG correspond to the runtimes required by the serial data stream to move from one timer to the next or from one communication unit to the next. The runtimes may also be referred to as "propagation times" or "transmit times".

These latencies expediently remain constant. They can therefore be recorded as compensation values as part of a (one-off) compensation procedure and set at the respective timers ZG. The latencies are then permanently compensated—i.e. the timers ZG run permanently synchronously without further compensation having to take place. In particular, there is no drift between the timers ZG.

The following explains how the communication unit S1 compensates the latency of its timer ZG. Expediently, the other communication unit(s) perform corresponding compensations.

Expediently, the timer ZG is adapted to adjust the time value according to a compensation value, in order to compensate for a runtime of the input data stream and/or the output data stream between communication units. The time value can be expediently compensated in relation to the communication unit upstream in the series—i.e. exemplarily in relation to the communication unit M—or in relation to the communication unit downstream in the series—i.e. exemplarily in relation to the communication unit S2. In the former case, the runtime of the input data stream from the upstream communication unit to the present communication unit is to be determined. In the latter case, the runtime of the output data stream from the present communication unit to the downstream communication unit is to be determined.

The communication unit S1 is in particular adapted to determine the compensation value on the basis of a time difference $\Delta t1$ between the output of a test signal via the first output A1 and the reception of the test signal via the second input E2. The communication unit S1 is in particular adapted to measure this time difference $\Delta t1$ by means of the timer ZG, i.e. especially by means of the symbol input clock. For example, the time difference $\Delta t1$ can be measured as a number of symbols or clock cycles of the input symbol clock. The time difference $\Delta t1$ corresponds to the runtime of the serial data stream along the communication path from the first output A1 to the second input E2 of the communication unit S1.

Expediently, the communication unit S1 is adapted to obtain a compensation determination value from a further communication unit M, S2 and to determine the compensation value on the basis of the compensation determination value and the time difference.

For example, the communication unit S1 may obtain from the downstream communication unit S2 a compensation determination value indicating the time difference $\Delta t2$ between a test signal output via the first output A1 of the downstream communication unit S2 and received via the second input E2 of the downstream communication unit S2. This time difference $\Delta t2$ corresponds to the runtime of the serial data stream along the communication path from the first output A1 of the communication unit S2 to the second input E2 of the communication unit S2.

The communication unit S1 can now determine the compensation value on the basis of the two time differences $\Delta t1$ and $\Delta t2$, in particular on the basis of the difference between the two time differences—i.e. on the basis of $\Delta t1 - \Delta t2$—and adjust the time value of the timer accordingly.

Expediently, the communication unit S1 is adapted to take into account a line parameter when determining the compensation value, which, for example, defines the relationship of the line runtimes of the two lines L2, L4 to each other. Expediently, the two lines of a communication link between two communication units have the same length, so that the line runtimes of the two lines are the same. As an example, a line parameter of 2 results. The difference of the time differences—i.e. $\Delta t1 - \Delta t2$—is expediently divided by the line parameter.

The communication unit S1 is expediently adapted to provide a compensation determination value based on the time difference $\Delta t1$ and to output the compensation determination value to another communication unit. Expediently, the communication unit S1 is adapted to pass on its compensation determination value to the upstream communication unit—here the communication unit M—and/or the downstream communication unit—here the communication unit S2.

The communication unit M may determine the compensation value for its timer on the basis of the obtained compensation determination value and a self-measured time difference $\Delta t0$ (i.e. the runtime of the test signal from the output A1 of the communication unit M to the input E2 of the communication unit M).

In a corresponding manner, the communication unit S2 may determine the compensation value for its timer on the basis of the obtained compensation determination value and the self-measured time difference $\Delta t2$ (i.e. the runtime of the test signal from the output A1 of the communication unit S2 to the input E2 of the communication unit S2).

Alternatively or additionally, the communication units M, S1, S2 can transmit and/or exchange one or more compensation values to compensate for latencies.

According to a first exemplary embodiment, the compensation procedure is as follows:

The communication unit M generates, within the serial data stream, a test signal which passes through the communication path.

Each communication unit M, S1, S2 sets its timer ZG to an initial value when the test signal is received. The initial value can, for example, be specified by the communication unit M and transmitted together with the test signal (or as a test signal).

Each communication unit M, S1, S2 measures the runtime of the test signal between its first output A1 and its second input E2, i.e. the time difference between output and receipt of the test signal at the same communication unit.

The measured time differences are transmitted as compensation determination values to the respective downstream communication unit—i.e. from communication unit M to communication unit S1 and from communication unit S1 to communication unit S2.

The communication unit S1 determines, on the basis of the compensation determination value from the communication unit M and its self-measured time value or time difference, a compensation value. The compensation value corresponds to the runtime from the communication unit M to the communication unit S1. The communication unit S1 corrects the time value of its timer on the basis of the compensation value. Furthermore, the communication unit S1 transmits its compensation value to the communication unit S2.

The communication unit S2 determines, on the basis of the compensation determination value from communication unit S1 and its self-measured time value or time difference, a compensation value. The compensation value corresponds to the runtime from the communication unit S1 to the communication unit S2. The communication unit S2 corrects the time value of its timer based on its own compensation value and the compensation value received from the communication unit S1.

As a result, the time values of the communication units S1, S2 are corrected to the time value of the communication unit M.

According to a second exemplary embodiment, the compensation procedure is as follows:

The communication unit M generates, within the serial data stream, a test signal which passes through the communication path.

Each communication unit M, S1, S2 sets its timer ZG to an initial value when the test signal is received. The initial value can, for example, be specified by the communication unit M and/or transmitted together with the test signal (or as a test signal).

Each communication unit M, S1, S2 measures the runtime of the test signal between its first output A1 and its second input E2, i.e. the time difference between output and receipt of the test signal at the same communication unit.

The communication unit M transmits its measured time difference as compensation determination value to all subsequent communication units S1, S2.

The communication unit S1 determines, on the basis of the compensation determination value from the communication unit M and its self-measured time value or time difference, a compensation value. The compensation value corresponds to the runtime from the communication unit M to the communication unit S1. The communication unit S1 corrects the time value of its timer on the basis of the compensation value.

The communication unit S2 determines, on the basis of the compensation determination value from communication unit M and its self-measured time value or time difference, a compensation value. The compensation value corresponds to the runtime from the communication unit M to the communication unit S2. The communication unit S2 corrects the time value of its timer on the basis of the compensation value.

As a result, the time values of the communication units S1, S2 are corrected to the time value of the communication unit M.

According to a third possible embodiment, the compensation procedure is as follows:

The communication unit M generates, within the serial data stream, a test signal which passes through the communication path.

Each communication unit M, S1, S2 generates a time stamp for each reception and transmission of the test signal. As an example, the communication unit M generates the time stamp ZS_M_A1 when sending the test signal via the output A1 and the time stamp ZS_M_E2 when receiving the test signal via the input E2. As an example, the communication unit S1 generates the time stamp ZS_S_E1 when receiving the test signal via the input E1, the time stamp ZS_S1_A1 when sending the test signal via the output A1, the time stamp ZS_S1_E2 when receiving the test signal via the input E2 and the time stamp ZS_S1_A2 when sending the test signal via the output A2. For example, the communication unit S2 generates the time stamp ZS_S2_E1 when receiving the test signal via the input E1, the time stamp ZS_S2_A1 when sending the test signal via the output A1, the time stamp ZS_S2_E2 when receiving the test signal via the input E2 and the time stamp ZS_S2_A2 when sending the test signal via the output A2.

Each communication unit M, S1, S2 calculates at least one runtime of the test signal between an input and an output. Expediently, the communication unit M calculates the time difference ZD1_M as the difference between ZS_M_E2 and ZS_M_A1. Expediently, the communication unit S1 calculates a first time difference ZD1_S1 as the difference between ZS_S1_A2 and ZS_S1_E1. The communication unit S1 further expediently calculates a second time difference ZD2_S1 as the difference between ZS_S1_E2 and ZS_S1_A1. The communication unit S2 expediently calculates a first time difference ZD1_S2 as the difference between ZS_S2_A2 and ZS_S2_E1. The communication unit S2 further expediently calculates a second time difference ZD2_S2 as the difference between ZS_S2_E2 and ZS_S2_A1.

The communication unit M expediently transfers the time difference ZD1_M and its time stamp ZS_M_A1 to each communication unit S1, S2.

The communication unit S1 is adapted to calculate the runtime L_M_S1 from the communication unit M to the communication unit S1 on the basis of the first time difference ZD1_S1 and the time difference ZD1_M. For example, the difference of the two time differences ZD1_S1 and ZD1_M is formed and divided by the above mentioned line parameter to calculate the mentioned runtime L_M_S1.

The communication unit S1 is further adapted to calculate a time difference ZD_S1_M between the time value (or timer ZG) of the communication unit S1 and the time value (or timer ZG) of the communication unit M on the basis of the time stamps ZS_S1_E1 and ZS_M_A1.

The communication unit S1 is adapted to correct its local timer ZG (or its time value) on the basis of the runtime L_M_S1 and the time difference ZD_S1_M.

The communication unit S2 is adapted to calculate the runtime L_M_S2 from the communication unit M to the communication unit S2 on the basis of the first time difference ZD1_S2 and the time difference ZD1_M. For example, the difference between the two time differences ZD1_S2 and ZD1_M is formed and divided by the line parameter mentioned above to calculate the runtime L_M_S2.

The communication unit S2 is further adapted to calculate a time difference ZD_S2_M between the time value (or timer ZG) of the communication unit S2 and the time value (or timer ZG) of the communication unit M on the basis of the time stamps ZS_S2_E1 and ZS_M_A1.

The communication unit S2 is adapted to correct its local timer ZG (or its time value) on the basis of the runtime L_M_S2 and the time difference ZD_S2_M.

As a result, the time values of the communication units S1, S2 are corrected to the time value of the communication unit M.

In the following, a procedure for determining a cable length shall be described:

The communication unit M generates within the serial data stream a test signal which passes through the communication path.

Each communication unit M, S1, S2 generates a time stamp for each reception and transmission of the test signal. As an example, the communication unit M generates the time stamp ZS_M_A1 when sending the test signal via the output A1 and the time stamp ZS_M_E1 when receiving the test signal via the input E1. As an example, the communication unit S1 generates the time stamp ZS_S1_E1 when receiving the test signal via the input E1, the time stamp ZS_S1_A1 when sending the test signal via the output A1, the time stamp ZS_S1_E2 when receiving the test signal via the input E2 and the time stamp ZS_S1_A2 when sending the test signal via the output A2. For example, the communication unit S2 generates the time stamp ZS_S2_E1 when receiving the test signal via the input E1, the time stamp ZS_S2_A1 when sending the test signal via the output A1, the time stamp ZS_S2_E2 when receiving the test signal via the input E2 and the time stamp ZS_S2_A2 when sending the test signal via the output A2.

Each communication unit M, S1, S2 calculates at least one runtime of the test signal between an input and an output. Expediently, the communication unit M calculate the time difference ZD1_M as the difference between ZS_M_E2 and ZS_M_A1. The communication unit S1 expediently calculates a first time difference ZD1_S1 as the difference between ZS_S1_A2 and ZS_S1_E1. The communication unit S1 further expediently calculates a second time difference ZD2_S1 as the difference between ZS_S1_E2 and ZS_S1_A1. The communication unit S2 expediently calculates a first time difference ZD1_S2 as the difference between ZS_S2_A2 and ZS_S2_E1. The communication unit S2 further expediently calculates a second time difference ZD2_S2 as the difference between ZS_S2_E2 and ZS_S2_A1.

The communication unit S1 transmits its first time difference ZD1_S1 and its second time difference ZD2_S1 to the communication unit M. The communication unit S2 transmits its first time difference ZD1_S2 and its second time difference ZD2_S2 to the communication unit M.

The communication unit M calculates the runtime on line L2 from ZD2_S1 and ZD1_S2, taking into account the above mentioned line parameter. The communication unit M calculates the length of the line L2 on the basis of the runtime and a propagation velocity value.

Figure 2:
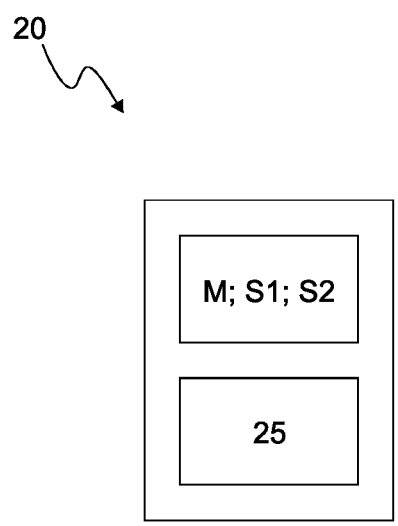
FIG. 2 shows a schematic representation of a control apparatus.

Expediently, a control apparatus 20 is provided, comprising a communication unit M, S1, S2 described above. FIG. 2 shows an exemplary embodiment of the control apparatus 20. The control apparatus 20 is configured to use the time value provided by the communication unit as a time stamp and/or to carry out, in accordance with the time value, a time-based control of a functional unit 25, in particular an actuator, sensor and/or a signal unit. The control apparatus 20 is preferably a field device.

A plurality of control apparatuses, in particular field devices, is expediently provided, each control apparatus comprising one or more of the communication units M, S1, S2. Preferably, each control apparatus has its own housing in which the respective communication unit and/or functional unit is arranged. In addition, one or more control apparatuses may each have one or more modules, one communication unit and/or one functional unit being arranged in each of the modules. Expediently each module has its own housing.

Expediently, the control apparatuses are adapted to carry out, on the basis of the time value provided by the respective communication unit, a timed, in particular synchronous, control of their respective associated functional unit.

In accordance with a preferred embodiment, each control apparatus comprises as a functional unit a signal unit, in particular a display and/or LED, and is adapted to provide, on the basis of its respective time value, a signal, such as an optical signal, synchronous to signals of the signal units of the other control apparatuses.

What is claimed is:

1. A communication unit for industrial automation for use in a communication system of series-connected communication units, the communication unit comprising a first input, a first output, and an internal clock generator adapted to provide an internal clock signal as a system clock for clocking the communication unit, the communication unit being configured to receive via the first input an input serial data stream having payload data, wherein the communication unit has a timer for providing a time value, the timer being adapted to provide the time value based on an input symbol clock included in the input data stream.

2. The communication unit according to claim 1, wherein the internal clock generator is adapted to provide the internal clock signal independently of the input symbol clock.

3. The communication unit according to claim 1, wherein the timer is adapted to increment or decrement the time value for an incoming symbol of the input data stream.

4. The communication unit according to claim 1, wherein the communication unit is adapted to provide at its first output an output data stream having an output symbol clock whose clock rate is identical to the clock rate of the input symbol clock of the input data stream.

5. The communication unit according to claim 4, wherein the communication unit is adapted to provide the output data stream with an output symbol clock having a permanently fixed phase relationship to the input symbol clock.

6. The communication unit according to claim 5, wherein the communication unit is adapted to continuously adjust the signal shape of the output data stream to achieve the permanently fixed phase relationship.

7. The communication unit according to claim 1, wherein the communication unit is adapted to provide an output data stream output at the first output with the same number of symbols as the input data stream received at the first input contains.

8. The communication unit according to claim 1, wherein the timer is adapted to adjust the time value according to a compensation value, in order to compensate for a runtime of the input data stream and/or an output data stream between communication units.

9. The communication unit according to claim 8, wherein the communication unit has a second input and a second output and the communication unit is adapted to determine the compensation value on the basis of a time difference between an output of a test signal via the first output and a reception of the test signal via the second input and/or to determine the compensation value on the basis of a time difference between a reception of the test signal via the first input and an output of the test signal via the second output.

10. The communication unit according to claim 9, wherein the communication unit is adapted to provide a compensation determination value based on the time difference and to output the compensation determination value to a further communication unit.

11. The communication unit according to claim 9, wherein the communication unit is adapted to obtain a compensation determination value from a further communication unit and to determine the compensation value on the basis of the compensation determination value and the time difference.

12. A control apparatus comprising a communication unit according to claim 1, wherein the control apparatus is adapted to use the time value as a time stamp and/or to carry out, according to the time value, a time-based control of a functional unit.

13. The control apparatus according to claim 12, wherein the functional unit comprises an actuator, a sensor and/or a signal unit.

14. A communication system comprising a first communication unit and a plurality of further communication units each adapted according to claim 1, the first communication unit having an output and an input and the further communication units each having a first input, a first output, a second input and a second output, the communication units being connected in series, in such a way that a communication path is provided which, starting from the output of the first communication unit, runs in the order prescribed by the series successively through each first input and each second output of the further communication units to the first output of the last communication unit in the series, and from there, runs in reverse order successively through each second input and each second output to the input of the first communication unit.

15. A method for determining a time value for a communication unit, comprising the steps of:
  providing, by means of an internal clock generator of the communication unit, an internal clock signal as system clock of the communication unit;
  receiving, by means of a first input of the communication unit, a serial input data stream with payload data; and
  providing, by means of a timer of the communication unit, the time value on the basis of an input symbol clock contained in the input data stream.

* * * * *